May 11, 1926.
M. MARTINOV
BAKING PAN
Filed Nov. 11, 1925
1,584,181.
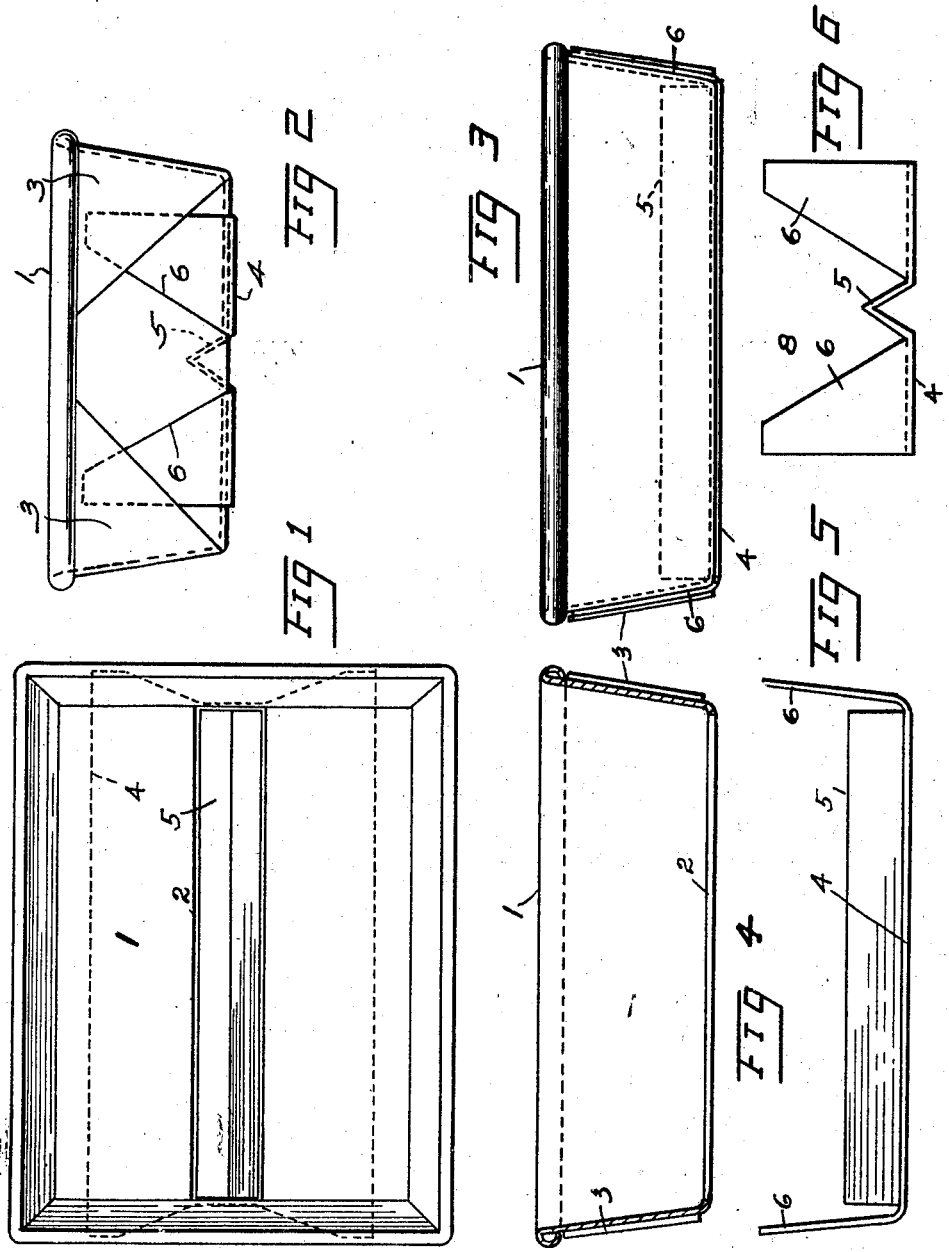

Patented May 11, 1926.

1,584,181

UNITED STATES PATENT OFFICE.

MILIVOJ MARTINOV, OF SALT LAKE CITY, UTAH.

BAKING PAN.

Application filed November 11, 1925. Serial No. 68,326.

This invention relates to a baking pan having a shock absorber attached thereto which also answers for a reenforcement for the ends and bottom of the pan.

One object of this invention is to provide a baking pan provided with a longitudinal shock absorber and reenforcement to prevent the ends and bottom being jammed in the handling thereof.

Another object of this invention is to provide a baking pan with a shock absorber applied thereon in such a manner that it will reenforce the pan lengthwise and form a marker in the bottom of the pan that will form a groove in the bottom of a loaf of bread or the like in the baking thereof.

Another object of this invention is to provide a baking pan, simple in construction and durable in service that can be stamped and folded by automatic machinery in such a manner to allow the ends of the shock absorber to be secured under the end or corner folds.

With these and other objects in view the invention consists of the following parts hereinafter described and claimed.

Referring to the drawings forming a part of this specification, in which;

Figure 1 is a plan view of a baking pan showing slot 2 with reenforcement 5 therein.

Fig. 2 is an end view of Fig. 1.

Fig. 3 is a side view of Fig. 1.

Fig. 4 is a vertical longitudinal section view through the slot 2 with the shock absorber and reenforcement removed.

Fig. 5 is a side view of the reenforcement or shock absorber, and

Fig. 6 is an end view of Fig. 5.

The shock absorber 4 has an inverted V ridge 5 formed in the center and running lengthwise thereof. The ends 6 are notched out at 8 in such a manner that when the ends are bent upward there will be a part on each side of the inverted V ridge 5.

The numeral 1 denotes a baking pan having a slot 2 running the full length of the bottom thereof. The corners 3 are formed in the stamping and the slot 2 is also cut therein by the stamping thereof.

The reenforcement is applied to the pan 1 by placing the inverted V, 5 in the slot 2 and the ends 6 under the corner bends 3. The sides of the reenforcement are brazed to the bottom of the pan while the ends are left free to give when hit by the baker's peel.

The reenforcement 4 is a shock absorber as the sides thereof project outward from the sides of the inverted V, 5 thus raising the outer corners of the bottom of the pan off the floor of the oven, which allows the baker's peel to be placed under the pan without giving the pan a flip or sudden knock. The ends 6 being placed under the corners 3 will have a certain amount of spring which also acts as a shock absorber when hit by the baker's peel.

Having described my invention what I claim as new and desire to secure by Letters Patent, is;

1. A baking pan comprising sides, ends and a bottom, a longitudinal slot in the bottom, a strap of inverted V-shaped cross-section to fit in said slot and means for holding said inverted V in said slot.

2. A baking pan having a slot in the bottom, said slot running the full length thereof, a reenforcement for said pan, said reenforcement having an inverted V ridge thereon to fit within said slot and means for securing said reenforcement to said pan.

3. A baking pan having a slot in the bottom running the full length thereof, a shock absorber, an inverted V ridge on said shock absorber to fit within said notch, the ends of said shock absorber being bent in such a manner to fit under a fold at the corners of said pan and means for securing said shock absorber to said pan substantially as described.

4. A baking pan having a slot in the bottom, a reenforcement for said pan having an inverted V ridge thereon, said ridge to fit within said slot, the ends of said reenforcement made in such a manner to fit under the corner folds of said pan and means for securing said reenforcement to said pan, substantially as described.

MILIVOJ MARTINOV.